No. 816,747. PATENTED APR. 3, 1906.
A. SABROE.
CLAY CLEANING APPARATUS.
APPLICATION FILED AUG. 12, 1905.

UNITED STATES PATENT OFFICE.

AXEL SABROE, OF AASTRUP, GERMANY.

CLAY-CLEANING APPARATUS.

No. 816,747. Specification of Letters Patent. Patented April 3, 1906.

Application filed August 12, 1905. Serial No. 273,944.

*To all whom it may concern:*

Be it known that I, AXEL SABROE, a subject of the German Emperor, residing at Aastrup, near Hadersleben, Germany, have invented certain new and useful Improvements in Clay-Cleaning Apparatus, of which the following is a full, clear, and exact specification.

In machines serving to clean the clay it is important that the parts separated from the soft body of clay or retained therefrom should not be eliminated and fall off at once, because a good deal of clay is adhering to them and could be separated therefrom before the impurities are removed from the machine. The machine forming the object of the present application is especially adapted for this purpose, and to this end in front of an ordinary screw press a moving grate with suitable projections is arranged which pushes the foreign matter upwardly against another screw, which by a certain pressure, occurring when the accumulation has sufficiently increased, is set in motion by being coupled with a constantly-revolving friction-plate, so that this screw finally lifts the eliminated foreign matter and throws it laterally out of the machine. A device of this kind on which the eliminated foreign bodies produce motion of transporting-screws only with the growing accumulation and by the pressure created therewith can also be used in clay-cleaning machines having a horizontally-movable grate.

Figure 1:
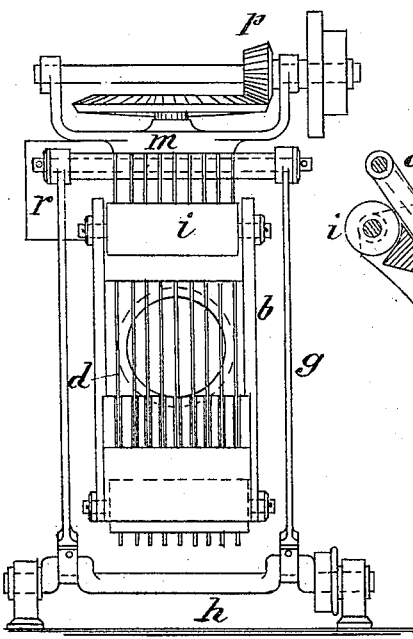
Figure 2:
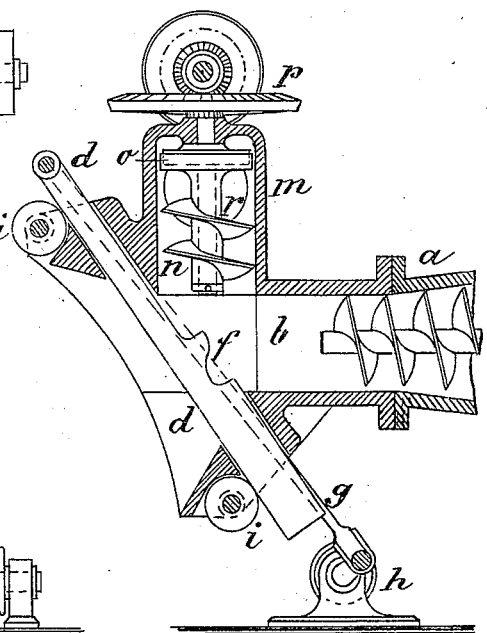

The accompanying drawings, forming part of this specification, show a machine embodying my invention in elevation in Figure 1, and in vertical section, Fig. 2.

In front of the mouthpiece $a$ of a press with a revolving screw the casting $b$ is provided with suitable projections for the bearings of guide-rollers $i$. Upon these rollers a grate $d$ is arranged to slide in an inclined direction, depending from the position of the rollers $i$. The grate-bars are each provided with projections $f$, extending laterally from the grate-bars toward the mass of fresh clay. Motion is imparted to this grate by connecting-rods $g$, which are linked to its upper cross-bar and pivotally connected with their lower ends to the cranks of a shaft $h$. It is evident that the sliding motion of the grate may be effected in any other convenient manner. The grate-bars are each guided in slots of the casing $b$, so that the grate-bars are at the same time scraped and kept clean. In front of the grate and above the same the casing has an extension $m$, with a transporting-screw $n$, the shaft of which carries on the top end a friction-plate $o$. Above said friction-plate and a small distance therefrom is a constantly-revolving friction-plate receiving motion by bevel-gears $p$ from a suitable shaft. $r$ is a lateral opening in the casing $m$ inclosing the screw $n$.

The operation of the apparatus is as follows: While the clay in the casing $b$ is pressed forward by the horizontal screw and passes out between the grate-bars $d$, the impurities are retained by the same and are moved upwardly by the projections $f$, while the grate is guided to and fro by the crank-shaft. The foreign bodies, accumulating more and more, rise into the casing $m$ and in exerting a pressure against the screw $n$ lift the same so that the friction-plate $o$ comes in contact with the revolving counter-plate and is thereby set in motion. By this motion part of the foreign matter is lifted and thrown out through the opening $r$. As soon as thereby the pressure is decreased the plate $o$ separates from the revolving friction-plate and the screw comes again to a standstill. During the upward working of the foreign bodies the parts of good clay still adhering to the impurities are gradually working down and escape with the clay which is delivered through the grate-bars.

Having thus described my invention, what I claim is—

A clay-cleaning machine comprising a grate movable in an inclined direction and having grate-bars with offsets adapted to lift the impurities retained by said grate-bars in combination with a transporting-screw in a part of the casing above said grate having a lateral opening, said screw being provided with a friction-plate at its upper end, adapted to engage with a constantly - revolving friction-plate when the pressure of the accumulated impurities lifts the screw substantially as described and for the purpose set forth.

In testimony whereof I affix my signature.

AXEL SABROE.

In presence of—
G. HERMES,
JULIUS RÖPKE.